April 24, 1962 H. A. KERSTETTER ET AL 3,030,694
LEAD MAKING APPARATUS AND METHOD
Filed Jan. 30, 1956 10 Sheets-Sheet 1
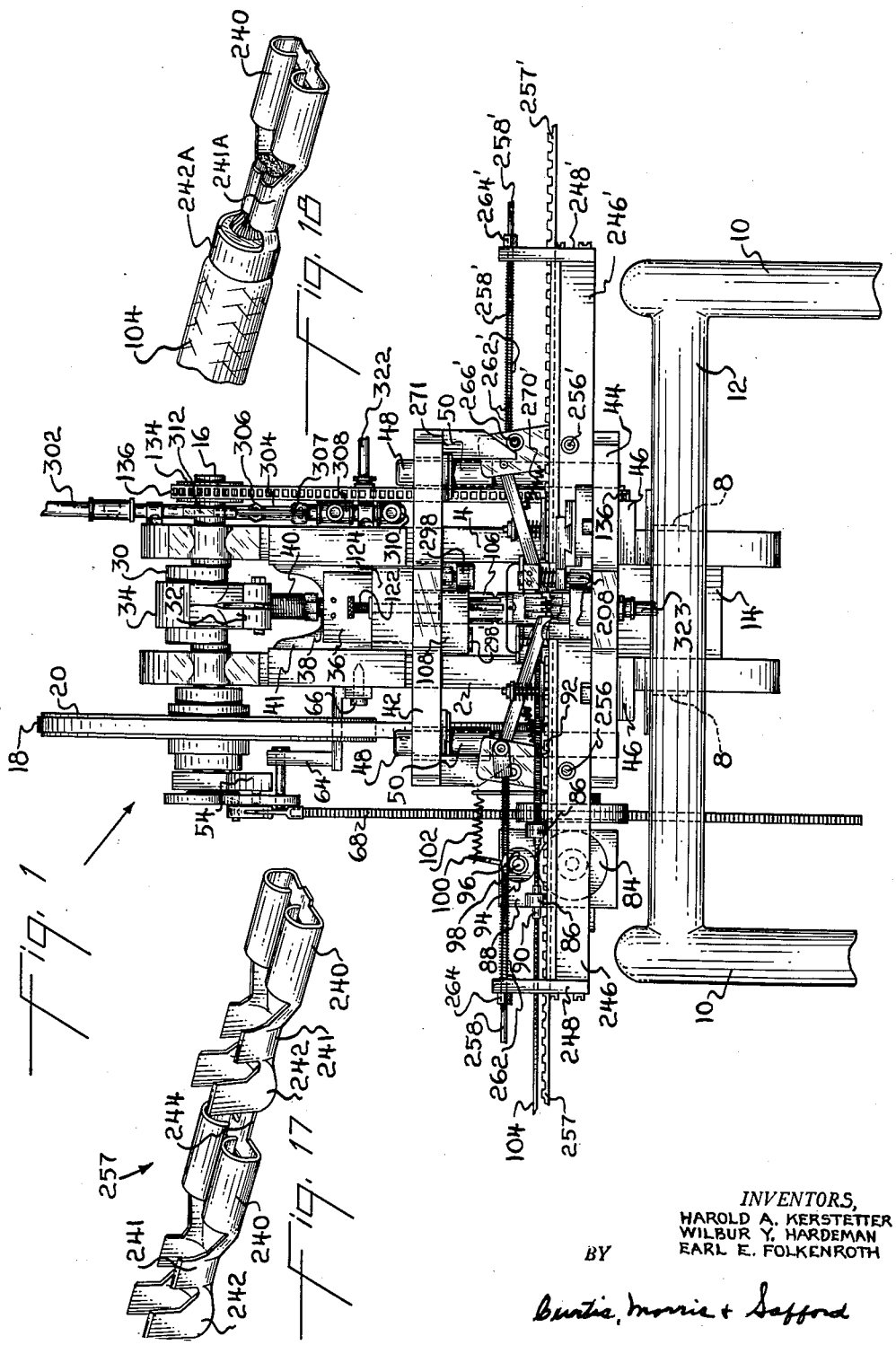
INVENTORS,
HAROLD A. KERSTETTER
WILBUR Y. HARDEMAN
EARL E. FOLKENROTH
BY
Curtis, Morris & Safford

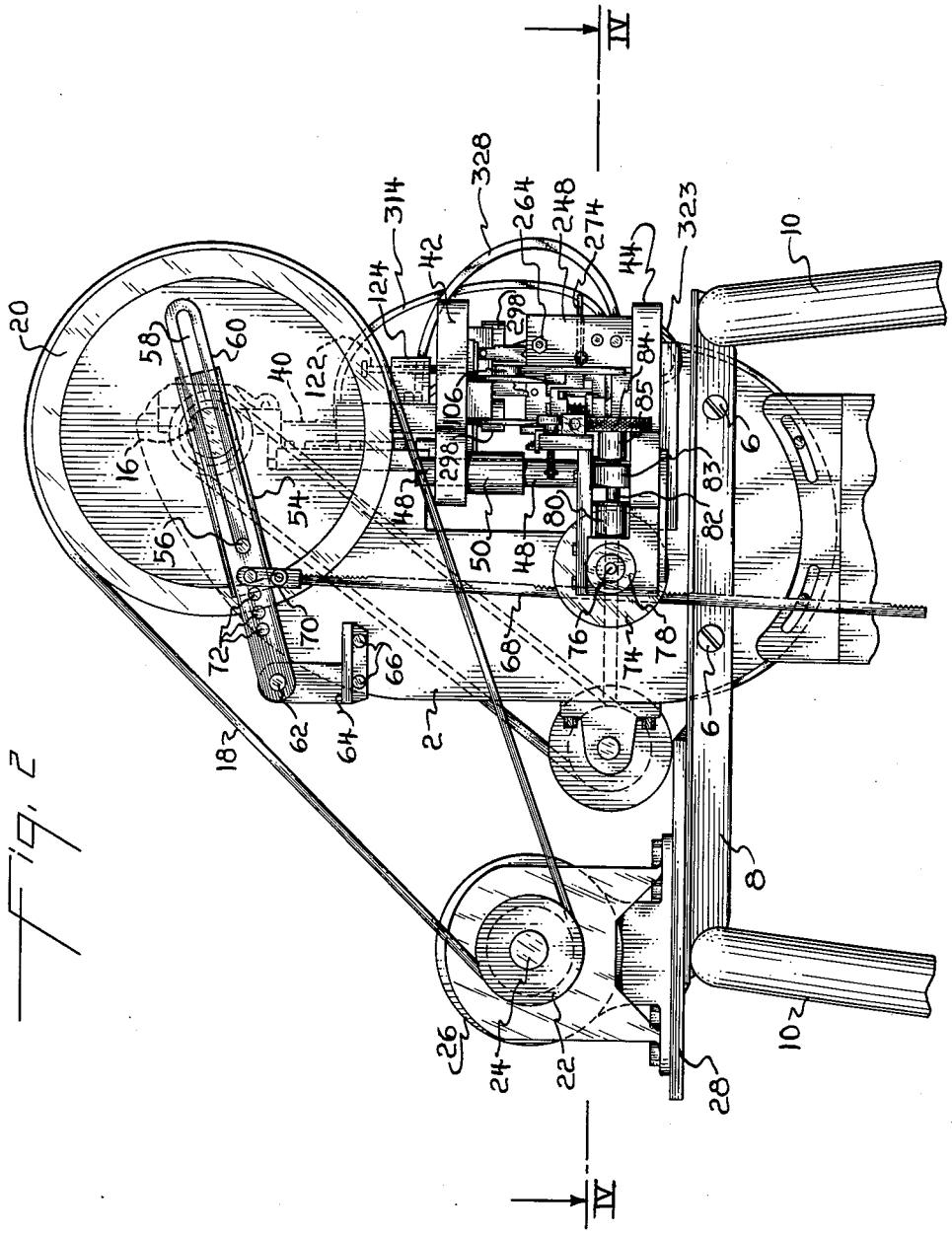

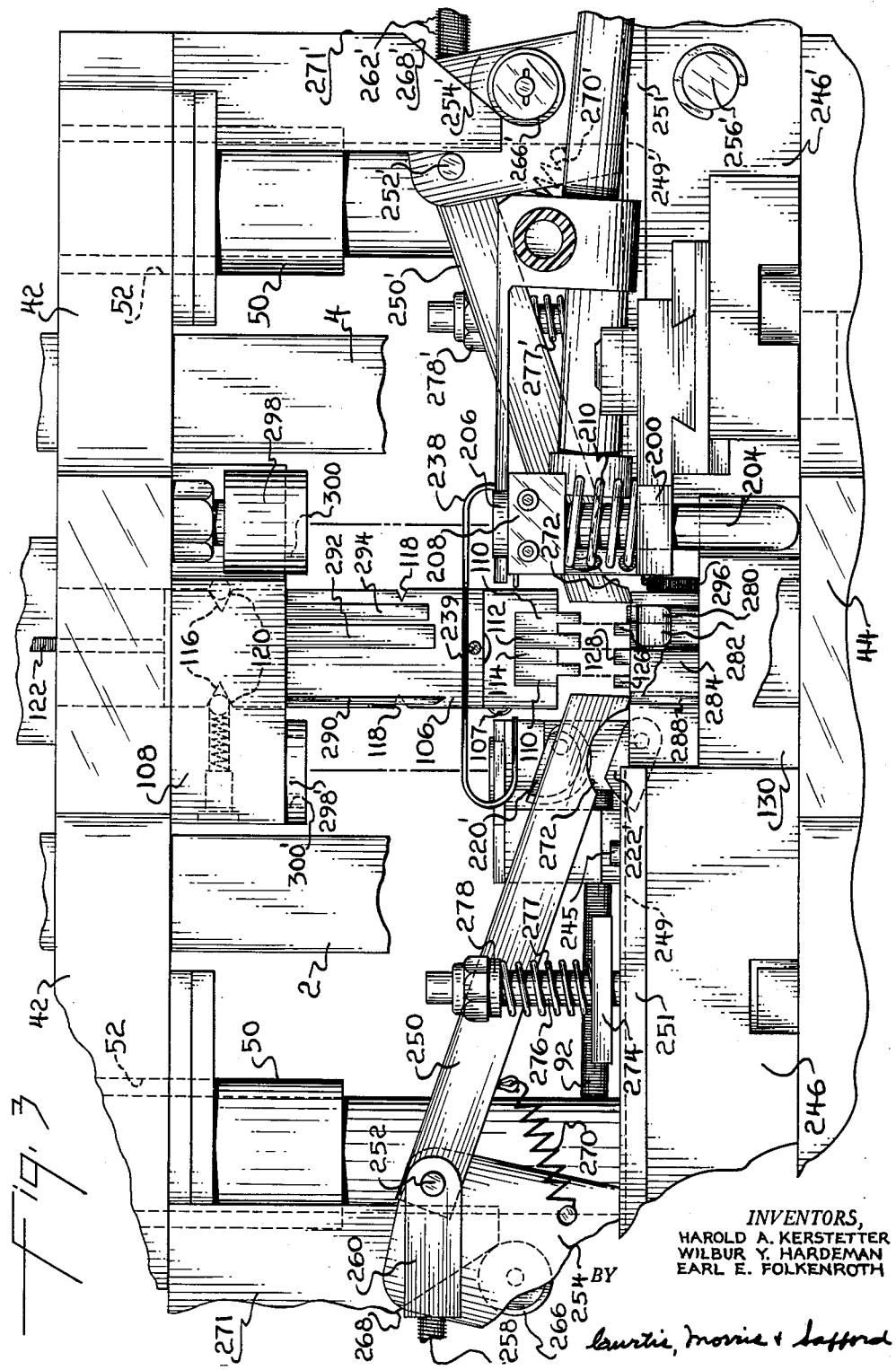

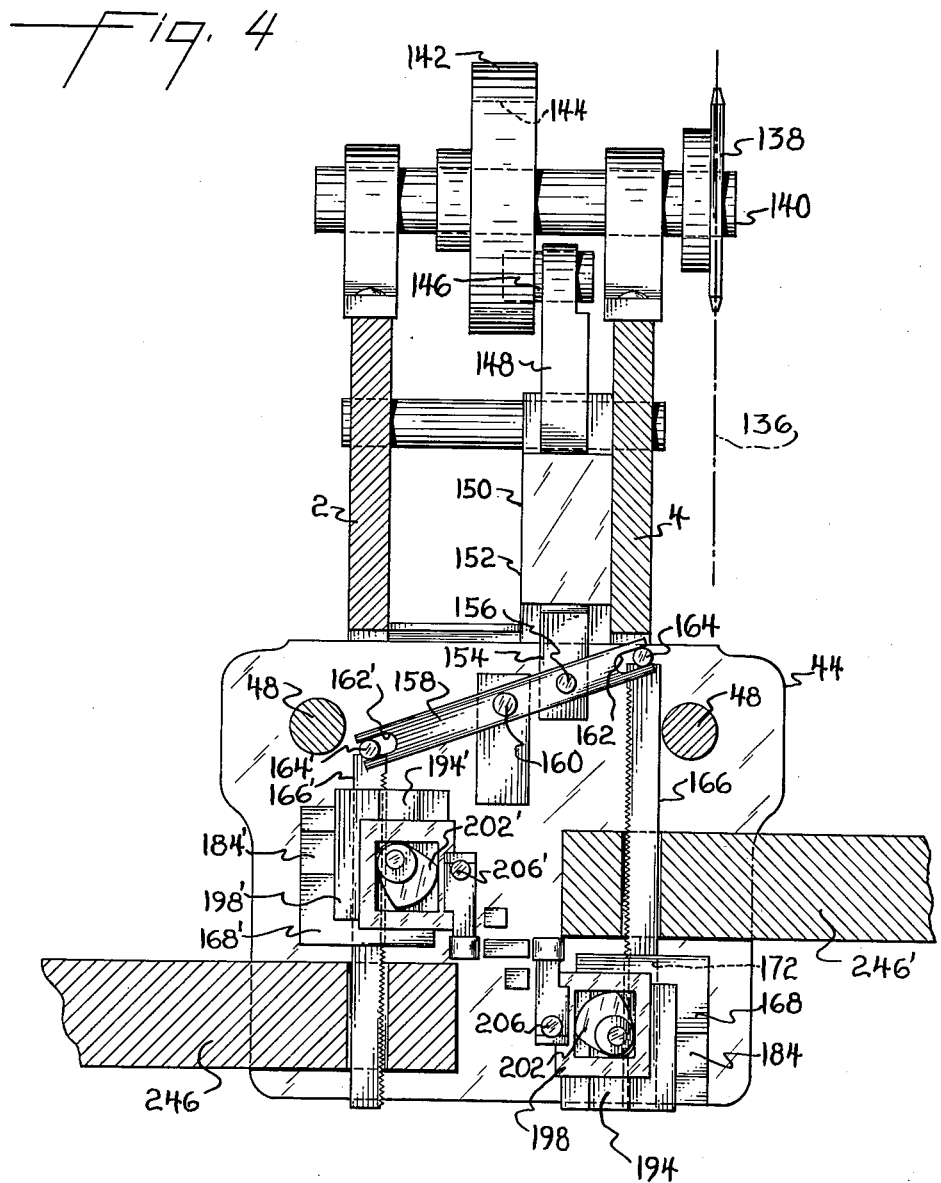

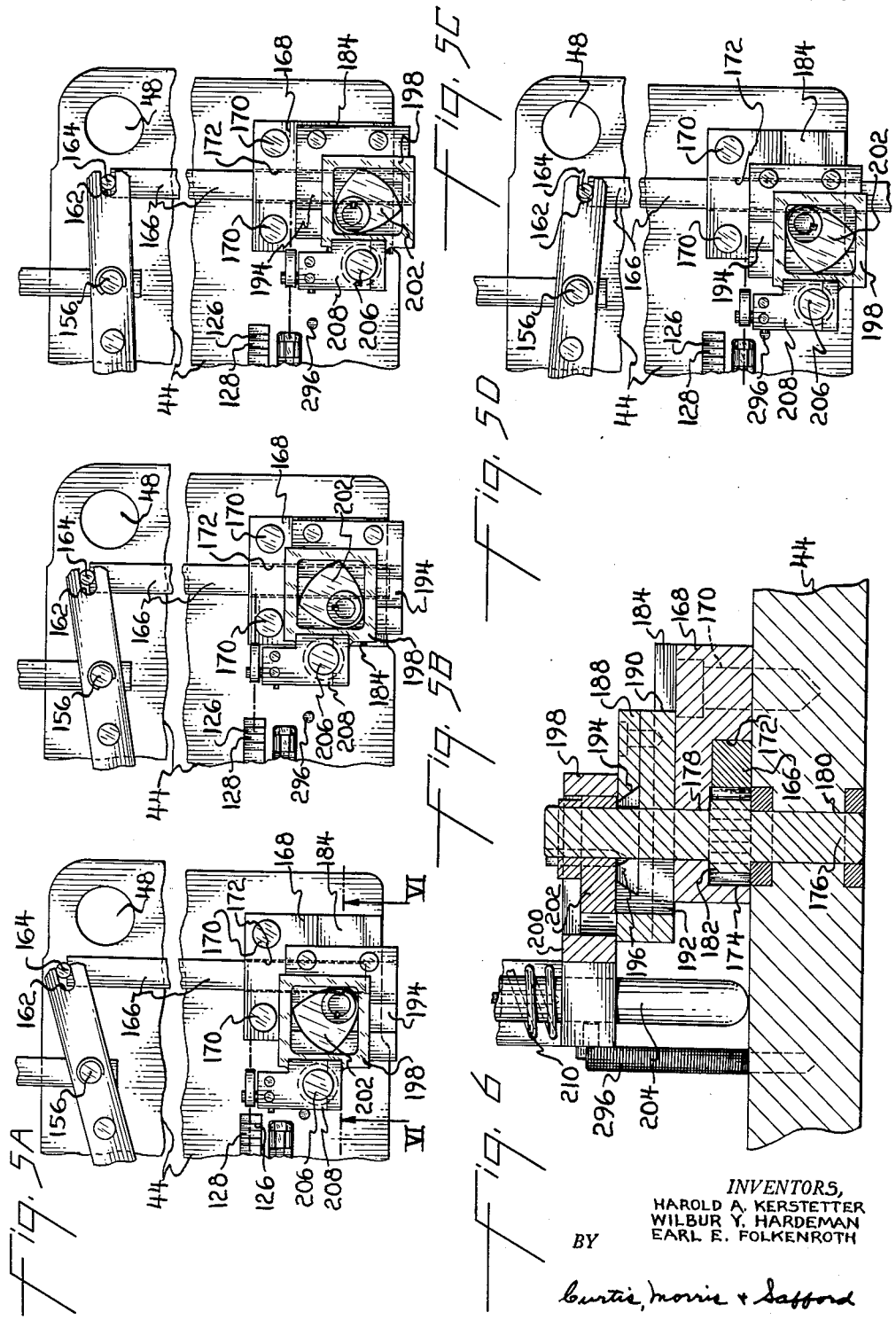

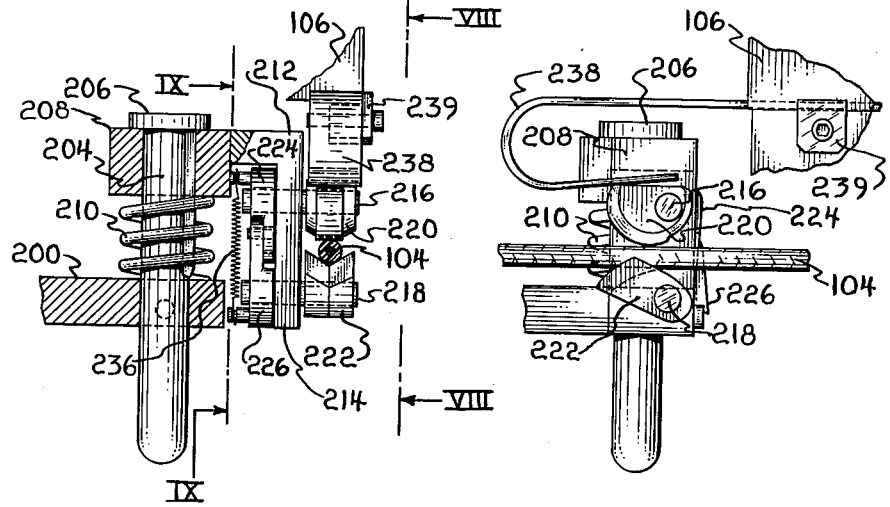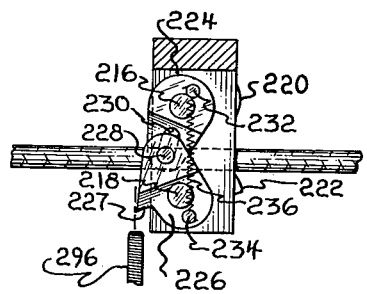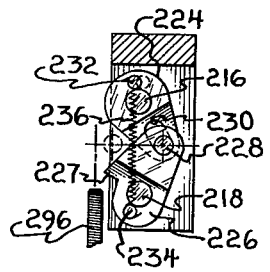

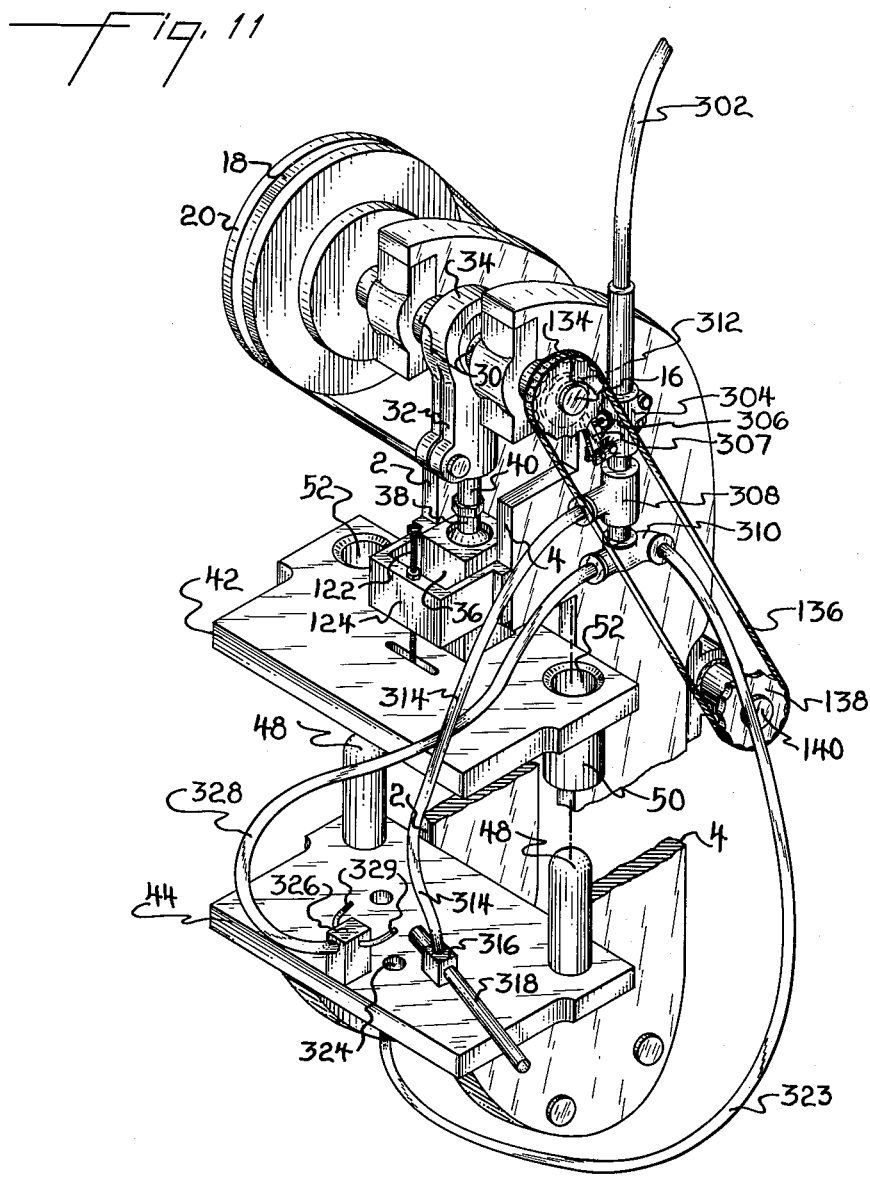

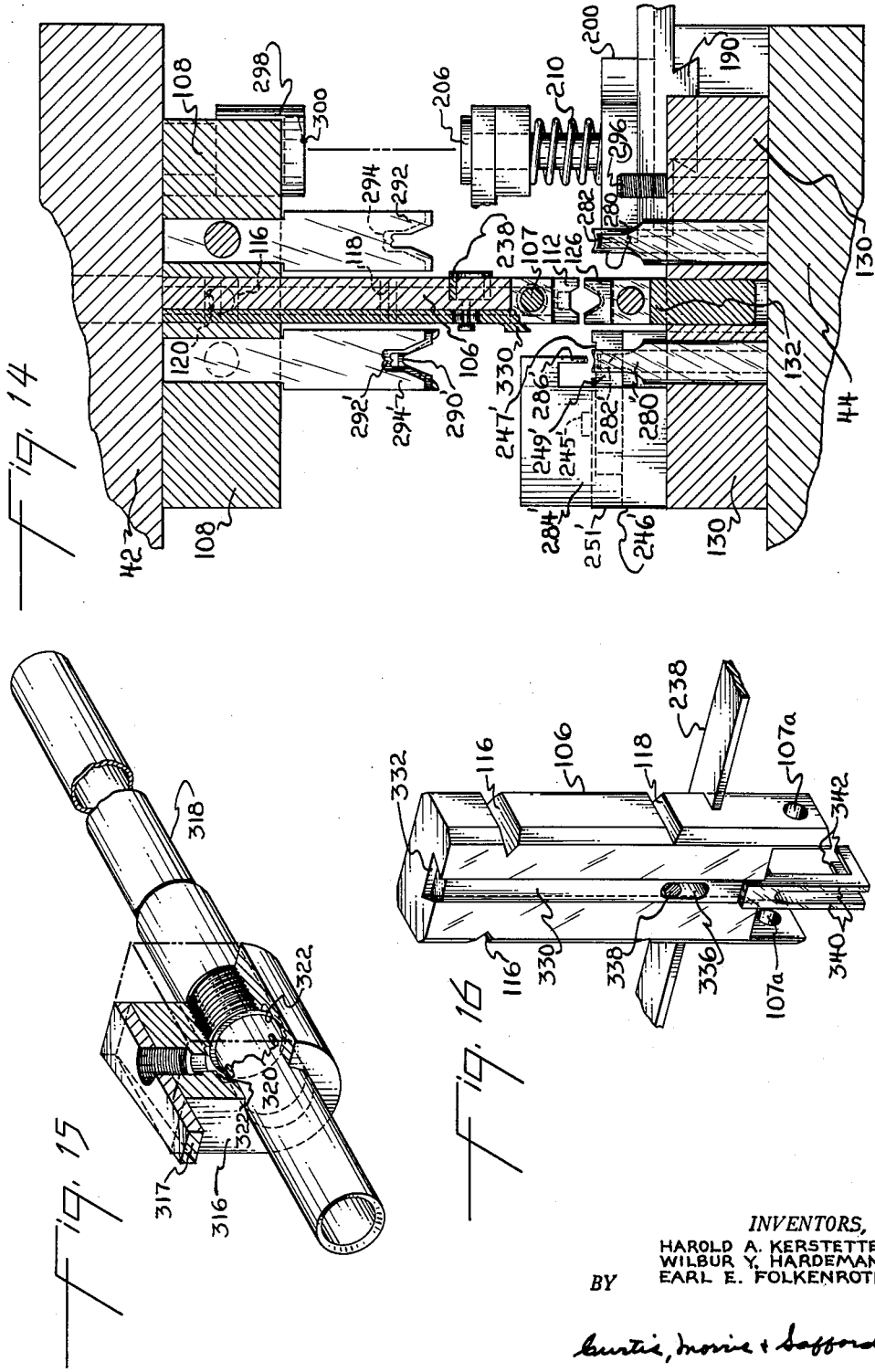

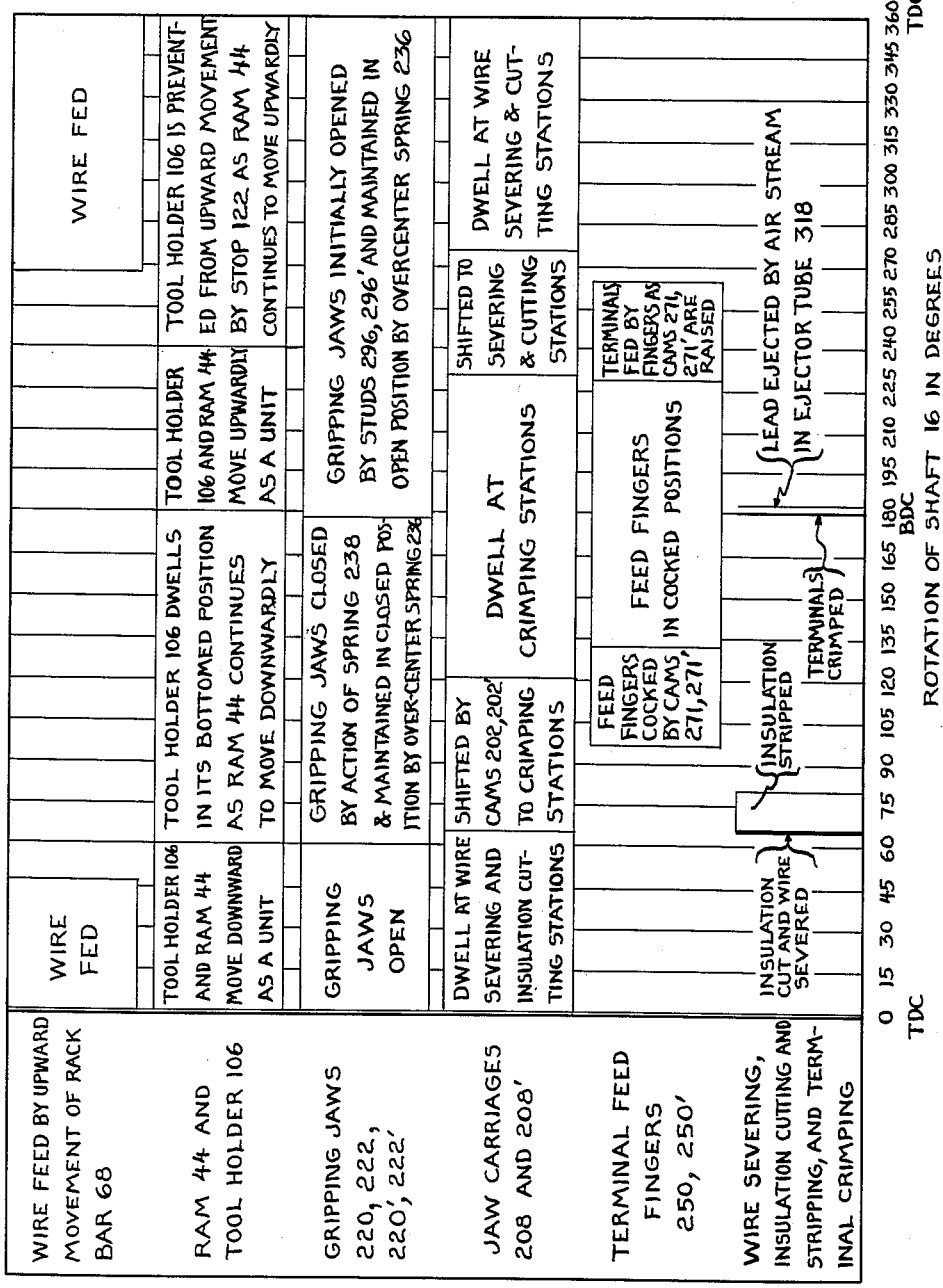

United States Patent Office 3,030,694
Patented Apr. 24, 1962

3,030,694
LEAD MAKING APPARATUS AND METHOD
Harold A. Kerstetter, Harrisburg, Wilbur Y. Hardeman, Carlisle, and Earl E. Folkenroth, Paxtang, Pa., assignors to AMP Incorporated, a corporation of New Jersey
Filed Jan. 30, 1956, Ser. No. 562,198
7 Claims. (Cl. 29—33)

This invention relates to apparatus for making electrical leads.

A recognized desideratum in the lead making field is the automatic production of electrical leads each comprising, for example, a length of insulated wire from which insulation has been stripped at each end and providing a suitable connector, of the open barrel type or the closed barrel type or the insulation piercing type, secured onto each of the stripped ends. Various methods and machines have been devised for lead making operations but none of these prior art machines and methods are capable of automatically producing leads in the form described above. For example, the patents to Berg, Nos. 2,694,808 and 2,694,809, disclose a method and apparatus for producing from a coil or other endless source of wire leads having insulation-piercing type terminals on one end or both ends thereof. The Berg method and apparatus have proved to be highly successful but are limited, as noted above, to the production of leads having insulation-piercing terminals on their ends and there are many circumstances under which these types of terminations are not adequate. Another presently-available lead making method and apparatus is shown in the patent to Andren, No. 2,545,756 which discloses a lead making apparatus capable of the automatic production of leads each having insulation stripped from both ends and providing a terminal on one of the stripped ends. The shortcoming of this machine is, of course, that if a terminal is required at both ends of the lead, it is necessary to apply this additional terminal in a subsequent operation with another apparatus.

An additional desideratum in the lead making field is the provision of a machine capable of performing any one of several operations or selected ones of several possible operations to produce leads in any one of several possible forms. Lead making machines, in general, require a relatively large capital investment and it is therefore impractical to acquire several specialized machines in order to provide the tooling needed to produce a variety of types of leads.

It is one of the objects of the present invention to provide apparatus for feeding wire, severing a lead from the end thereof, stripping insulation from both the leading end of the wire and the trailing end of the severed lead and securing one terminal onto the leading end of the wire and another terminal onto the trailing end.

A further object of the invention is to provide a lead making apparatus which is characterized by a high degree of versatility and adaptability and which is capable of producing a wide variety of types of leads; for example, leads having an insulation-piercing type terminal on one end and a barrel-type terminal on the opposite end, leads having one end stripped and having a terminal of either the insulation-piercing type or the barrel type on the opposite end and leads having both ends stripped.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration in order that others skilled in the art may fully understand the invention and the principles thereof and the manner of applying it in practical use so that they may modify it in various forms, each as may be best suited to the conditions of a particular use.

In the drawings:

FIGURE 1 is a front view of a preferred apparatus embodiment of the invention;

FIGURE 2 is a side view of the apparatus of FIGURE 1;

FIGURE 3 is a fragmentary enlarged view with some parts broken away of the operating zone of the apparatus of FIGURE 1 looking into the apparatus from front;

FIGURE 4 is a sectional view, with parts omitted in the interest of clarity, taken along the line IV—IV of FIGURE 2 and looking into the operating zone from above;

FIGURES 5A, 5B, 5C and 5D are fragmentary top plan views of the lead gripping and moving means which forms part of the invention and showing the movement of these parts during a portion of the operating cycle of the apparatus;

FIGURE 6 is a view taken along the lines VI—VI of FIGURE 5A;

FIGURE 7 is a fragmentary end view of the wire end gripping means which forms part of the invention showing the gripping means in their closed position;

FIGURE 8 is a view looking in the direction of the arrows VIII—VIII of FIGURE 7;

FIGURE 9 is a view taken along the line IX—IX of FIGURE 7;

FIGURE 10 is a view similar to FIGURE 9 illustrating the gripping means in the open position;

FIGURE 11 is a perspective fragmentary view looking from the right hand side of the machine as viewed in FIGURE 1 and showing the pneumatic lead ejector and insulation blower components of the apparatus, other components of the machine being omitted from this view in the interest of clarity;

FIGURE 14 is a view taken along the lines XIV—XIV of FIGURE 12 and also along the line XIV—XIV of FIGURE 13 looking in the direction of the arrows in each case;

FIGURE 15 is a perspective view with parts broken away of a pneumatic lead ejecting device which forms part of the invention;

FIGURE 16 is a perspective view of a tool holder incorporating insulation ejecting means which forms part of the invention;

FIGURE 17 is a perspective view of two terminals, in strip form, of a type which can be crimped onto the end of a wire in the practice of the invention;

FIGURE 18 is a perspective view of one end of a lead having a terminal of the type shown in FIGURE 17 crimped thereon; and FIGURE 19 is a timing diagram which illustrates the sequence of operations of the apparatus.

Figure 12:
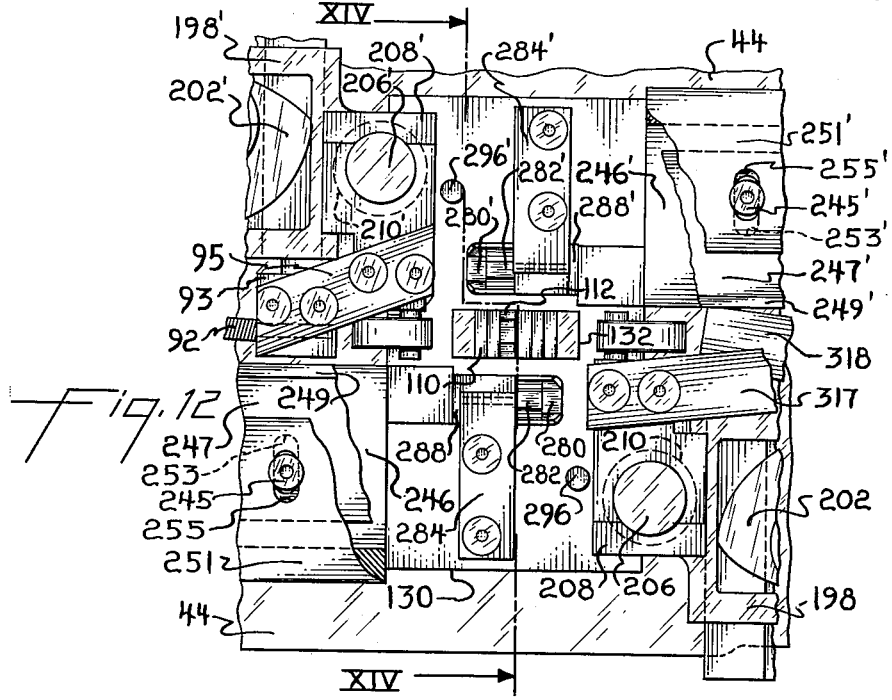
FIGURE 12 is a view looking downwardly into the operating zone from a point directly thereabove.

The apparatus embodiment of the invention shown in the drawings provides tooling capable of sequentially performing the following operation; feeding a predetermined length of wire, severing a lead from the end of the fed wire, stripping the insulation from the trailing end of the lead and from the leading end of the wire, shifting the leading end of the wire and the trailing end of the lead respectively to a wire crimping station and a lead crimping station, feed one terminal to the wire crimping station and one terminal to the lead crimping station, crimping the thus positioned terminals onto the leading end of the wire and the trailing end of the lead, ejecting the lead and repeating these steps to produce a succession of leads. Several of these operations may be omitted if it is desired to produce leads other than the type having insulation stripped from each end and having terminals crimped onto the bared ends. The apparatus is herein disclosed in relation to its most comprehensive cycle of operation in the interest of facility and completeness of descriptions and with the understanding that several of the described operations may be omitted or varied without departing from the scope of the invention as set forth in the claims.

Referring to FIGURES 1 and 2, the reference numerals 2,4 denote a pair of C-shaped frame members secured by means of bolts 6 to angle bars 8 which in turn are secured to a machine base consisting of tubular legs 10 and cross members 12. C-shaped frame members 2, 4 are connected to each other by means of one or more plates 14, only one such plate being shown in the drawing. A shaft 16 journalled in the top portions of frame members 2, 4 is driven by means of an endless belt 18 extending over a pulley 20 mounted on shaft 16 and over a pulley 22 mounted on the shaft 24 of an electric motor 26 which is anchored to a plate 28 supported on angle bars 8.

Shaft 16 provides an eccentric 30 between frame members 2, 4. A connecting rod 32 is connected to eccentric 30 at one end thereof by means of a collar 34 and at the other end is connected to a reciprocable block 36 by means of a ball and socket joint 38, the socket of which is formed in the block 36. The lower end of connecting rod 32 comprises a threaded rod 40 which at its upper end is threadedly secured to collar 34 and which at its lower end provides the ball of ball and socket joint 38. Block 36 reciprocates within guideways 41 provided on the opposed faces of frame members 2, 4 and is secured on its lower end to a ram 42.

A platen 44 is mounted upon flanges 46 integral with frame members 2, 4 by welding or any similar means. This platen supports various components of the wire feeding, cutting and severing means and the terminal feeding and crimping means as described below. At this juncture it will be apparent that as shaft 16 rotates ram 42 reciprocates towards and away from the platen 44.

Figure 13:
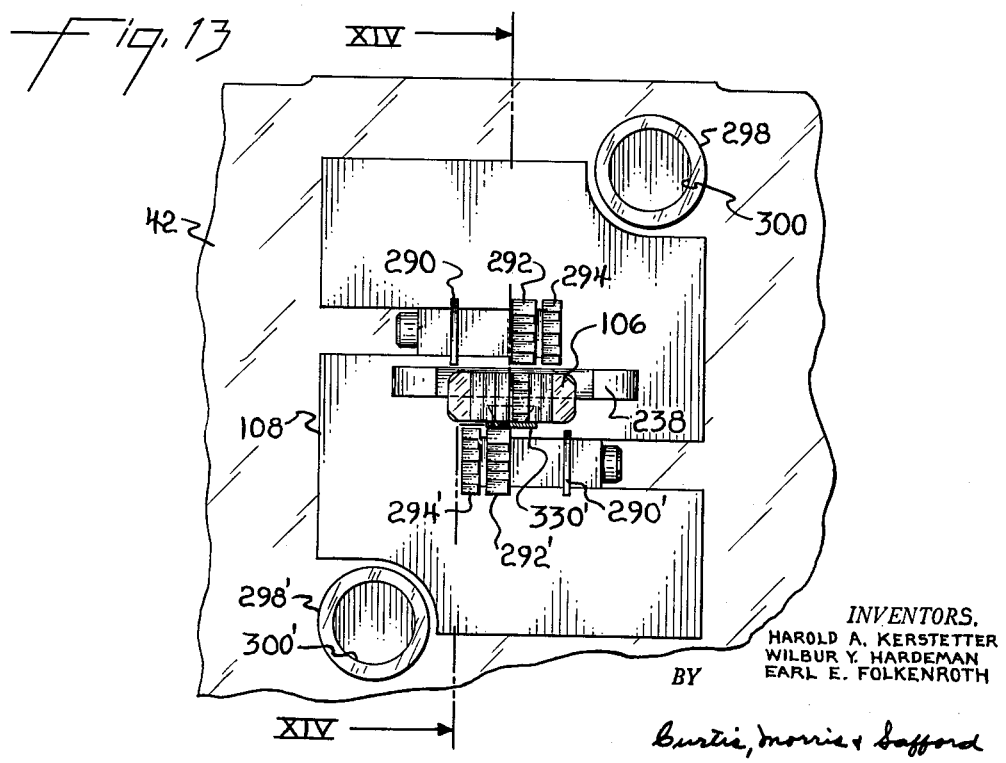
FIGURE 13 is a view looking upwardly from the operating zone and showing the cutting, severing and crimping tooling carried by the ram of the machine press.

The zone containing the wire feeding, cutting, etc. components is referred to in this specification and in the appended claims as an "operating zone," the central portions of which are shown in detail in FIGURES 3, 12 and 13. A pair of upstanding guide rods 48 are mounted integrally with platen 44 and are adapted to enter a pair of guide sleeves 50 mounted in axial alignment with a pair of apertures 52 in ram 42 (see FIGURE 3). This arrangement assures accurate alignment of the various severing, stripping and crimping mechanisms located in the operating zone when the ram moves into its bottom dead center position.

THE FEEDING MECHANISM

A crank arm 54 is secured to shaft 16 on the left hand side thereof as viewed in FIGURE 1. A pin 56 extends from the extreme end of the crank arm and registers in a slot 58 of a feed arm 60 pivoted by means of a pin 62 to a bracket 64 secured to frame member 2 as by bolts 66. A rack bar 68 is pivotally secured to feed arm 60 by means of a pin and clevis 70, the pin of which extends through an aperture 72 in the feed arm, a plurality of such apertures being provided in order that the position of the rack bar pivot point may be varied.

Rack bar 68 meshes with a wire feeding device which is substantially identical with that shown and described in the U.S. Patent to Berg, No. 2,688,133 to which reference is hereby made for details of the feeding device which are not specifically shown in the appended drawing. As disclosed in said Berg patent, the rack bar engages a rack gear (not shown) enclosed within a housing 74 and mounted on a shaft 76 the end of which provides an overrunning clutch 78 so that said shaft is not turned on the down stroke of rack 68 but is turned by the action of the clutch when the rack is on its up stroke.

As in the wire feeding mechanism of said Berg patent, a bevel gear on shaft 76 engages a bevel gear on a transverse shaft 82 which extends through a bearing block 83 and which carries a driven feed wheel on roller 84 having a hub 85, these bevel gears being not shown but being enclosed within the housing 80. An upper feed roll 94 which serves to press the wire against roll 84 is mounted upon a concentric ball bearing 96 which, in turn, is eccentrically supported upon a pivot 98 carried by upright plate 88. An arm 100 connected to the eccentrically mounted bearing 96 and biased by a spring 102 in a clockwise direction about the pivot 98 tends to hold upper roll 94 against the wire 104 and against the lower (driven) roll 84.

As shown more fully in FIGURE 1, the wire feeding roll or wheel 84 has its topmost segment extending between two bosses 86 on the upright plate 88, the left hand one of the bosses 86 supporting a flexible wire conduit 90 which guides the wire substantially to the bite of the feed rolls and the right hand one of the bosses 86 supporting one end of a flexible wire conduit 92 which enters, and is secured to, a guide block 93 (see FIGURE 12). This guide block is connected by means of a bracket 95 to a jaw carriage 208 described in detail below.

From what has been set forth thus far, it will be apparent that as shaft 16 rotates in a clockwise direction as viewed in FIGURE 2, pin 56 on the end of crank arm 54 describes a circular path and thereby causes feed arm 60 to oscillate about its pivot 62. The oscillation of this feed arm imparts a substantially reciprocatory motion to rack bar 68 so that on the up stroke of this rack bar, feed wheel 84 is actuated through the action of the gear enclosed in housing 74, the overrunning clutch 78 on shaft 76, the bevel gears contained within housing 80 and the shaft 82 to which feed wheel 84 is keyed or otherwise secured. On the down stroke of rack bar 68, of course, these parts are not actuated and no wire is fed.

The disclosed feeding mechanism differs significantly from the feeding mechanism shown in the aforesaid Berg patent insofar as the reciprocation of rack bar 68 is concerned. By virtue of the fact that rack bar 68 is reciprocated by the motion of pin 56 in slot 58, the instant feeding mechanism as disclosed will feed wire during a portion of the up stroke of ram 42, will continue to feed wire as the ram passes through its top dead center position and will continue to feed wire during a portion of the down stroke of the ram 42. The apparatus is shown in FIGURES 1 and 2 with the ram in its top dead center position. It will be obvious from FIGURE 2 that as shaft 16 rotates in a clockwise direction from the position shown, rack bar 68 will be displaced upwardly for a portion of the down stroke of the ram. This upward movement of the rack bar will cease, however, before the ram bottoms (i.e., before pin 56 reaches a position 180° from its position of FIGURE 2) and the rack bar will begin to move downwardly.

In the operation disclosed, wire is fed during only about 140° of rotation of shaft 16 rather than 180° of rotation of the shaft as in the aforementioned Berg patent 2,688,133. Specifically, in the instant apparatus wire is fed (see FIGURE 19) during about the last 93° of the up stroke of ram 42 and during about the first 47° of the down stroke of the ram.

An advantage of the disclosed actuating means for rack bar 68 is that the portion of the stroke of the ram during which wire is fed can be varied by merely changing the position of crank arm 54 relative to shaft 16. For example, if it is desired to feed wire only during a portion of the down stroke of the ram rather than during an interval encompassing the top dead center position of the ram, it would only be necessary to change the position of arm 54 on shaft 16 to a position such that pin 56 would begin to oscillate arm 60 downwardly when ram 42 begins to move downwardly. In the disclosed apparatus it is contemplated that the wire feeding be completed about 126° before the ram bottoms for reasons which will be apparent from the description presented hereinbelow of the wire severing and stripping mechanism. It is sometimes desirable to provide a relatively longer feeding interval than is available during the first portion of the downward movement of the ram and for this reason pin 62 is positioned such that wire feed during about 140° of shaft rotation encompassing top dead center is obtained.

The interval of wire feed, as measured by degrees of rotation of shaft 16, can readily be varied by changing the position of fixed pivot point 62. If fixed pivot 62 were to move to the right from the position shown the feeding interval would be decreased while movement to the left of this fixed pivot would have the effect of increasing the feeding interval.

The amount of wire fed during the feeding interval can be regulated either by varying the stroke of rack bar 68 or by changing the diameter of feed wheel 84. It is, of course, merely necessary to change wheel 84 for one of larger or smaller diameter if it is desired to regulate the amount of wire fed in the latter manner. The stroke of bar 68 can be varied by changing its position on arm 60 and in the disclosed embodiment a plurality of apertures 72 are provided for this purpose. It will be apparent from the drawing that changing the position of either fixed pivot 62 or pin 56 will also change the stroke of the rack bar and the amount of wire fed.

From the foregoing it can be seen that the disclosed feeding mechanism is highly versatile in that (1) the interval of wire feed as measured in degrees of rotation of shaft 16, (2) the amount of wire fed during the feeding interval and (3) the portion of the operating cycle of ram 44 during which wire is fed can all be varied at will.

*The Wire Severing and Insulation Cutting Mechanism*

An upper tool block 108 (see FIGURES 3, 14 and 16) is secured to the underside of ram 42 substantially centrally above the operating zone of the machine. An aperture extends entirely through this block and another aperture extends through the ram in alignment with the aperture in the block. These apertures slidably accommodate a tool holder 106 having tool means comprising a pair of upper insulating cutting blades 110 and an upper wire shearing blade 112 mounted on its lower end. As shown in FIGURE 3, the two upper insulation cutting blades are disposed one on each side of the centrally located upper wire shearing blade, a spacer 114 being interposed on one side of the shearing blade in order that the parts will be properly positioned relatively to each other. These cutting and shearing blades may be secured to the tool holder by any suitable means such as the disclosed bolt 107 received in a pair of apertures 107a and are removable to permit changing of the tooling for any one of several possible operations.

A pair of lower insulation cuting knives 126 are mounted on each side of a lower shearing blade 128 in a wire severing and insulation cutting station located centrally within the operating zone of the aparatus. These knives and the blade are mounted in a lower tool holder 132 by means of a screw 133. The lower tool holder is secured to a lower tool block 130 which in turn is secured to platen 44.

Tool holder 106 provides an upper pair of V-shaped notches 116 and a lower pair of V-shaped notches 118, one notch of each of said pairs being located on each side of the tool holder. Spring loaded detents 120 (shown in phantom in FIGURE 3) provided in block 108 enter the notches 116, 118 to lock tool holder 106 in either its lowermost position, as shown in FIGURE 3 with the detents seated in the notches 116, or in its uppermost position in which case detents 120 would be seated in notches 118. Thus detents 120 acting in conjunction with notches 116 constitute a first locking means for releasably locking the tool holder in its lowered position or at the extreme limit of its travel (relative to ram 42) towards the operating zone, while detents 120 acting in conjunction with notches 118 constitute a second locking means for releasably locking the tool holder in its upper position.

As the ram descends from the top dead center position of FIGURE 3 the tool holder and the ram move as a unit toward the operating zone, however, the upper cutting knives and severing blade bottom on lower cutting knives 126 and a lower severing blade 128 prior to bottoming of the ram itself. Upon bottoming of these cutting and severing members, a lead is severed from the end of the previously fed wire and the insulating adjacent the trailing end of the lead and the insulation adjacent the leading end of the wire is circumferentially cut. Thereafter detents 120 are forced against their respective springs and out of the notches 116 as the tool holder is released from the first locking means and the ram continues its descent, the tool holder meanwhile dwelling in its bottomed position. When the ram reaches bottom dead center, spring biased detents 120 enter notches 118 so that as the ram begins its upward stroke, the tool holder and ram move together.

A tool holder stop is provided for the purpose of releasing the tool holder from the locking effect of the detents and notches 118 during upward travel of the ram. In our preferred embodiment this releasing means takes the form of a rod 122 threaded through an aperture in a plate 124 supported at each end by frame members 2, 4 (see FIGURE 11). This rod extends downwardly, in aligned relationship to the tool holder and the apertures in which the tool holder reciprocates, a distance such that during the upward travel of the ram, the tool holder contacts rod 122 and is prevented from further movement with the ram. Thereafter the tool holder remains fixed and the ram moves upwardly over the tool holder until it reaches top dead center at which point detents 120 enter notches 116. In this manner the tool holder is cocked during each upward stroke of the ram for the cutting and severing operation of the ensuing downward stroke. This sequence of operation will be clear from a detailed study of the timing diagram of FIGURE 19, particularly the horizontal column which depicts the interrelationship of the motions of the tool holder and ram.

It should be noted that notches 116 are somewhat deeper than notches 118. The notches 116 should be of a depth sufficient to assure complete bottoming of cutting tools 110, 112 with concomitant severing of the wire and cutting of the insulation. In other words the locking effect of notches 116 and the detents should not be disturbed by a partial severing of the wire and a partial cutting of the insulation.

*The Wire and Lead Gripping, Stripping and Shifting Mechanism*

The disclosed apparatus provides mechanism for stripping the cut insulation from the trailing end of the lead and from the leading end of the wire by gripping the wire and lead and moving the lead and wire axially away from each other during the latter stage of descent of the ram. The previously cut insulation is restrained against movement by the upper and lower insulation cutting blades which, as explained above, are brought into complementary relationship prior to bottoming of the ram. This same mechanism, after it pulls the wire and lead from the cut insulation, functions to displace laterally the wire and lead in opposite directions and position them at crimping stations described below.

The actuating means for the gripping and shifting mechanism (see FIGURES 1, 4 and 11) comprises a sprocket 134 mounted upon shaft 16 on the right hand side thereof as viewed in FIGURE 1. A chain 136 connects sprocket 134 with a second sprocket 138 mounted on the end of a cam shaft 140 which is journalled in frame members 2, 4 at approximately the same level as the operating zone. A cam 142 mounted on shaft 140 provides a cam track 144 into which a cam follower 146 projects. This cam follower is mounted on the end of an extension 148 of a slide 150 reciprocable on a guideway 152 and providing a foreward extension 154. This foreward extension is pivotally connected at 156 to an oscillatable link 158 which is pivotally mounted intermediate its ends as indicated at 160.

It should be mentioned at this point that the diameters of sprockets 134 and 138 are such that the shaft 140 is rotated at the same speed as shaft 16 and cam track 144 is arranged in such manner that slide 150 will dwell in its "back" position during about the first 60° of the operating cycle as counted from top dead center. Thereafter the slide is moved to its forward position, or in other words is moved toward the operating zone, and completes this motion at the end of an additional 60°. Thus at the end of 120° of rotation of shaft 16 slide 150 is in its forward position. The cam track is arranged such that the slide will dwell in its forward position for an interval of approximately 112° of rotation of shaft 16 and will begin to return to its rearward position at about 232° or after the ram has bottomed and started its upward stroke. The return movement of the slide is completed within about 45° of shaft rotation so that slide 150 will be returned to its "back" position by the time shaft 16 rotates through about 280° of a complete cycle.

Link 158 is slotted at each end as indicated by reference numerals 162, 162' and receives in each of these slots a post 164, 164' which posts are integral with a pair of reciprocable rack bars 166, 166'. Each of these rack bars actuates a stripping and shifting mechanism and one of these mechanisms operates on the trailing end of the lead while the other operates on the leading end of the wire. Since these stripping and shifting mechanisms are substantially alike in the illustrative form, a description of one will suffice for both. Accordingly, only the stripping and shifting mechanism on the right in FIGURE 4, which operates on the severed lead, is described below. Similar reference numerals are used to designate corresponding parts of the two stripping and shifting mechanisms and prime marks are employed to indicate the shifting and stripping mechanism for the leading end of the wire.

Referring especially to FIGURES 4, 5A, 5B, 5C, 5D and 6, it can be seen that rack bar 166 reposes slidably on platen 44 and extends through a passage 172 in a slide base 168 which is secured to the platen by screws 170. The underside of the slide provides a substantially circular cavity 174 which opens into passage 172. Slide base 168 also provides a circular aperture 178 extending substantially coaxially with the circular cavity 174 and platen 44 is apertured at 180 beneath the circular cavity. A shaft 176 extends through the apertures 178, 180 and carries a gear 182 within circular cavity 174 which gear meshes with the teeth of rack bar 166 so that as the rack bar is reciprocated, the shaft oscillates about its axis.

Slide base 168 is provided along its upper surface with a dovetail groove 184 extending from left to right of FIGURE 6. An intermediate slide member 188 is slidably mounted upon base slide 168 and provides on its underside a dovetail projection 190 complementary to the groove 184. This intermediate slide is provided with a slot 192 through which shaft 176 extends; this slot is of a length sufficient to permit movement of the slide from the position of FIGURE 6 a short distance to the right.

A dovetail groove 194 extends across the upper face of intermediate slide 188 in a direction normally of the direction of the groove 184 and dovetail 190. This dovetail groove slidably accommodates the dovetail projection 196 of an upper slide or jaw slide 198 which as shown in FIGURES 5A to 5D consists of a substantially rectangular frame having an ear 200 integral therewith and provided with an aperture through which a jaw carriage post 204 extends. Shaft 176 extends through the central open portion of this jaw slide and has keyed to its end a cam 202 which, upon rotation of shaft 176, causes the slides 198, 188 to move relatively to each other and relatively to fixed slide base 168 in a manner described below.

The jaw carriage post 204 which extends through the aperture in ear 200 mounts a jaw carriage 208 which is retained in position by means of a cap 206 at the top of post 204. A helical spring 210, FIGURE 7, interposed between ear 200 and jaw carriage 208 normally biases the jaw carriage upwardly but when compressed permits downward movement of the carriage on the post. The lower extremity of the carriage post is preferably rounded in order to permit movement over the surface of platen 44 during movement of the shifting mechanism.

Jaw carriage 208 provides an L-shaped extension 212 shown best in FIGURE 7, the depending portion 214 of which rotatably accommodates a pair of pins 216, 218. As can be seen from FIGURE 4, this L-shaped projection extends inwardly toward the operating zone from the jaw carriage so that its external surface is in substantial alignment with lower cutting knives 126 and lower shearing blade 128. An upper gripping jaw 220 is secured to pin 216 for rotation therewith and a lower gripping jaw 222 is similarly secured to pin 218. These two gripping jaws complement each other to grip the trailing end of the lead 104, as shown in FIGURES 7 and 8 upon rotation of shaft 216 in a counter-clockwise direction and rotation of shaft 218 in a clockwise direction. It will be noted that these gripping jaws are cam shaped and that lower jaw 222 provides a V-notch around its periphery which is entered by a complementary projection on the periphery of the upper jaw.

A link 224 is secured to pin 216 on the opposite sides of the depending portion 214 of the L-shaped extension and a complementary link 226 is secured to the end of pin 218 as best shown in FIGURES 9 and 10. These two links overlap each other and are connected by a connecting pin 228 integral with link 226 and extending through an elongated slot 230 in upper link 224. A post 232 is provided on upper link 224 at a point above the axis of pin 216 and a similar post 234 is provided on lower link 226 below the axis of pin 218. These two posts are connected by a helical spring 236 which functions as an over center spring to maintain the jaws in either the fully open or fully closed position but which permits opening or closing of the jaws.

The jaws 220, 222 are closed during descent of the ram by a C-shaped leaf spring 238 secured in a slot in tool holder 106 by means of a retainer 239. One end of this spring (the right hand end as viewed in FIGURE 3) contacts jaw 220 during descent of the ram, as shown in FIGURE 8, and rotates this jaw through a portion of a revolution in a counter-clockwise direction. By virtue of the pin-slot connection between the jaw links 224, 226, lower jaw 222 is rotated in a clockwise direction at the same time. During this rotation of the two jaws on their respective pins 216, 218, posts 232, 234 are intially moved apart along arcuate paths against the influence of helical spring 236. However, upon further rotation of the jaws, connecting pin 228 passes beneath spring 236 and the contractile tendency of the spring urges the jaws toward their closed or wire gripping position as shown in FIGURE 9. The jaws are subsequently opened before final bottoming of the ram in a manner described for reasons set forth below.

From the foregoing description of the gripping, stripping and shifting mechanism it will be apparent that as ram 42 descends the lead gripping jaws are closed upon the previously fed length of wire 104 by spring 238 and a lead 104' is severed from the end of the fed wire by the bottoming of the lead severing blades. Substantially simultaneously, the insulation is circumferentially cut as the upper insulation cutting knives bottom on the lower insulation cutting knives. Thereafter slide 150 begins to move forward under the influences of cam 142. Rack bar 166 is also moved foreward while rack bar 166′ moves backward. Rack bar 166 rotates gear 182 and with it shaft 176 and cam 202. FIGURES 5A to 5D show that as this cam rotates it initially causes slide 188, carrying slide 198, to move to the right over slide base 168. FIGURE 5B shows the position of the parts at the completion of this movement of slide 188. Upon further rotation of cam 202, slide 198 moves in its tracks on slide 188 in a direction toward the front of the machine, see FIGURE 5C. Upon further rotation of cam 202 to the position of FIGURE 5D, slide 188 retraces its path on slide 168 and moves to the left.

Since the slide 198 carries jaw mounting projection 200, the severed lead is pulled axially away from the vicinity of the insulation cutting knives during the initial movement of the slides shown in FIGURES 5A and 5B. Also, since the upper insulation cutting knives remain bottomed during this interval, the lead is pulled axially out of the severed insulation so that the jaws at the position of FIGURE 5B are gripping the end of the lead from which the insulation has been severed and removed. The two subsequent movements of slides 188, 198 reposition the trailing end of the lead at a crimping station which is laterally offset from the wire severing and insulation cutting station.

As mentioned above, the stripping and shifting mechanism for the leading end of the wire, which mechanism is shown on the left of FIGURE 4, operates in substantially the same manner as the lead stripping and shifting mechanism. There are minor differences, however, which are apparent from an examination of FIGURE 4. The leading end of the wire is, of course, stripped by movement of the gripping jaws in a direction opposite from the direction of movement of the lead. Also, the leading end of the wire is shifted to a crimping station disposed upon the opposite side of the severing and cutting station from the crimping station for the lead. Finally, it should be noted that rack bar 166′ moves backwardly to actuate cam 202′ and strip insulation from the leading end of the wire while rack bar 166 moves forwardly during this portion of the cycle.

*The Terminal Feeding Mechanism and the Crimping Mechanism*

The disclosed apparatus is shown as being provided with the necessary tooling for crimping terminals of the type shown in FIGURE 17 in strip form to produce leads as shown in FIGURE 18. These terminals provide a receptacle portion 240 which is connected by a tapering neck to barrel forming portions 241 and 242. When a terminal of this type is crimped onto the end of a lead, the two upstanding sides of barrel forming portion 241 are curled towards each other into engagement with the end of the lead as shown at 241A. The barrel forming portion 242 is curled over the insulation of the lead as indicated at 242A. A connecting slug 244 connects the barrel forming portion 242 of each terminal with the receptacle portion 240 of the next adjacent terminal.

A strip of such terminals is fed into the apparatus from each side along offset parallel paths as indicated at 257, 257′ of FIGURE 1. Since the two terminal feeding mechanisms are substantially the same, a description of one will suffice for both. Similar reference numerals are used for corresponding parts of the two feed mechanisms and prime marks are used to indicate the terminal feeding mechanism for the leading end of the wire, while reference numerals without prime marks indicate the feeding mechanism for feeding terminals to the end of the lead.

Referring particularly to the terminal feeding mechanism on the left hand side of the machine as viewed in FIGURES 1 and 12 it can be seen that the terminals are fed, barrel-forming end first, along a terminal feed track 247. This terminal feed track is defined by a pair of complementary flanged plates 249 and 251 which are adjustably mounted by means of cap screws, as indicated at 245, and overlapping slots 253, 255 on a feed track base 246 mounted in turn on platen 44. As is apparent from the drawing, flanged plates 249, 251 can be adjusted towards and away from each other by virtue of slots 253, 255 in order to vary the width of feed track 247 for various sizes and types of terminals.

The strip of terminals in intermittently advanced along the depression by means of a feed finger 250, clearly shown in FIGURE 3, which is pivotally connected by a pin 252 to a feed arm 254. A light spring 270 normally biases finger 250 downwardly and the end of this finger is cut away as at 272 to facilitate its engagement with the strip of terminals as explained below. Feed arm 254 is pivoted by means of a pin 256 to feed track base 246 for oscillation therearound. A rod 258 is also pivoted to pin 252 by means of a clevis 260 and extends leftwardly through a helical compression spring 262 and through an oversized aperture in plate 248. The threaded end of this rod accommodates a pair of adjustable stop nuts 264 which prevent movement of the rod to the right beyond the point where stop 264 contacts plate 248.

A cam follower 266 mounted on the face of arm 254 normally bears against the inclined edge 268 of a cam 271 which is secured to and which depends from ram 42. As the ram descends this cam causes cam follower 266 to rotate the feed arm about its pivot 256 in a counterclockwise direction thus compressing spring 262. The feed finger is thus pulled back a linear distance equal to the length of at least one of the terminals on the strip. When the ram is raised, the restraining influence of cam 271 is removed and spring 262 causes arm 256 to return to its normal position shown in FIGURE 3. In doing so the finger pushes the strip of terminals a distance equal to the length of one terminal thereby to position the leading one of the terminals of the strip in the operating zone for attachment (in the case of the feed arm 250) to the trailing end of a previously severed lead.

It will be found that under some circumstances the strip of terminals has a tendency to overfeed because of the momentum imparted by the feed finger.

In the disclosed apparatus this is prevented by means of a drag plate 274 through which a post 276 extends from terminal feed track base 246. A spring 277 and a stop 278 urge the drag plate downwardly and resiliently against the strip of terminals to counteract their tendency to arch upwardly.

The central portion of the operating zone (see FIGURES 3, 12 and 14) on each side of the wire severing blades and insulation cutting knives, contains the necessary anvils for supporting the fed terminal for the crimping operation. Two sets of such anvils are provided in the present form, one set being mounted behind the severing and cutting devices at the crimping station for the leading end of the wire, and the other set being mounted in front of the severing and cutting devices at the crimping station for the trailing end of the lead. In the following paragraphs, only the crimping station for the trailing end of the lead is described since the arrangement of the parts at the two crimping stations is substantially alike again corresponding parts of the two crimping stations will be indicated by similar reference numerals and prime superscripts will be employed to differentiate between the wire crimping station and the lead crimping station.

It will be recalled that a lower tool block 130 is mounted on platen 44. An insulation anvil 280, a wire anvil 282 and a stripper 284 are removably mounted in slots in block 130 as shown best in FIGURE 14. The strip of terminals is fed intermittently, barrel-forming end first, so that the barrel forming portion 241 is positioned on wire anvil 282 and barrel forming portion 242 is positioned on insulation anvil 280. The receptacle portion of the fed terminal will then be disposed beneath the overhanging arm 286 of stripper 284 as shown in FIGURE 14 and the connecting slug 244 will then be disposed above a slot 288.

Upper tool block 108 carries a slugout blade 290, a wire crimper 292 and an insulation crimper 294. During descent of the ram the slugout blade removes the slug connecting the positioned terminal with the next adjacent terminal and the removed slug falls through slot 288 and through an aligned opening in the platen (not shown). The insulation crimper and wire crimper respectively curl the upstanding ears of the barrel forming portions 242 and 241 over the end of the lead to produce a termination as shown in FIGURE 18. As the ram moves upwardly the end of the lead tends to move upwardly with the crimping tools since the crimped parts become wedged within the crimping tools. The lead is disengaged, however, by the overhanging arm 286 of the stripper which engages the flat central portion of the receptacle and prevents it from moving farther upwardly with upper crimping tools 292, 294.

As explained previously, the trailing end of the lead is gripped by the gripping jaws when the spring 238 contacts the upper gripping jaw. The trailing end of the lead remains in the gripping jaws during the insulation stripping operation (FIGURES 5A and 5B) and while the end is laterally shifted and being brought up to the crimping station. It is desirable to release the jaws from their gripping engagement with the end of the lead prior to the actual crimping operation and to lower the end of the lead into the terminal positioned on the wire anvil and insulation anvil. This is accomplished by means of a tamper 298 secured to ram 42 and providing a recess 300 of such size as to receive cap 206 of the jaw carriage post. During the final stages of the descent of the ram, tamper 298 pushes jaw carriage 208 downwardly on jaw carriage post 204 against the force of spring 210 and thereby lowers the end of the lead into the barrel-forming portions of the positioned terminal. As the jaw carriage is pushed downwardly, a ledge 227 on lower link 226 contacts a stud 296 which shifts the lower link from the position of FIGURE 9 to the position of FIGURE 10 to open jaws 220, 222. Overcenter spring 236 maintains the jaws in the open position when the ram begins to rise so that the finished lead can be ejected in a manner described below.

*The Lead Ejecting and Insulation Ejecting Mechanism*

Compressed air is supplied (see FIGURES 11, 15 and 16) from a line 302 to a valve 304 having a plunger 306 which, when depressed, opens the valve to permit flow of air to fittings 308 and 310. Plunger 306 is depressed by the action of a pivoted lever 307 which in turn is actuated by a cam 312 mounted on shaft 16. The cam is of such shape that the plunger is maintained depressed during a brief interval after the ram has passed bottom dead center.

Fitting 308 is connected to an air hose 314 which leads to a wind box 316 mounted on a bracket 317 (FIGURE 12) which in turn is secured by means of screws to jaw carriage 208. An ejector tube 318 extends through and is threadedly secured to the wind box and a plurality of air passages 320 in the ejector tube communicate with an annular chamber 322 in the wind box. These air passages are inclined toward the axis of tube 318 so that an air stream is directed toward the outlet end of the tube when plunger 306 is depressed.

Wind box 316 and tube 318 are positioned relative to the jaw carriage such that when slides 188, 198 are positioned as shown in FIGURE 5A, the wire having a terminal on its leading end will be fed into ejector tube 318. The tube thus functions to support the leading end of the wire during the wire severing operation and supports the lead produced by the severing operation during the movements shown in FIGURES 5A to 5D. After a terminal is crimped onto the trailing end of the lead, plunger 306 is depressed by cam 312 and the completed lead is ejected from the tube by the force of the air stream.

It will be recalled that the sections of removed insulation are retained between insulation cutting knives and the wire severing blades when the trailing end of the lead and the leading end of the wire are pulled axially out of these sections of insulation. Normally these sections of insulation will be lodged either between the upper cutting knives and upper severing blade or between the lower cutting knives and the lower severing blade and it has been found that these severed sections do not consistently lodge in one or the other of these sets of cutting and severing tools. For this reason the disclosed apparatus provides means for dislodging insulation from both the upper cutting and severing tools and the lower cutting and severing tools.

The means for dislodging insulation from the lower severing tool comprises an air hose 323 which extends from fitting 310 to an aperture 324 in platen 44 (FIGURE 11) immediately below the lower cutting knives and severing blade. As the ram begins to rise, plunger 306 is maintained in its depressed condition by the action of cam 312 and compressed air flowing through air line 323 will dislodge any sections of severed insulation and blow them upwardly into the path of a second air stream emanating from nozzles 329 in a block 326 which is connected by an air hose 328 to fitting 310. This second air stream blows the sections of insulation rearwardly of the machine where they may be permitted to fall into a suitable collecting receptacle (not shown).

The means for dislodging the severed sections of insulation from the upper cutting and shearing tools comprises a dovetail ejector slide 330 slidably mounted in a groove 332 on tool holder 106. Slide 330 provides a slot 336 into which extends the end of a screw 338, which, in turn is threadedly received in an aperture in the tool holder. A pair of fingers 340 extend from the lower end of slide 330 and provide laterally projecting ends 342 which extend inwardly on each side of the upper shearing blade.

As shown by the drawing, ejector slide 330 is somewhat longer than tool holder 106. Also, this ejector slide is adapted to be contacted by stop 122 during ascent of the ram and before tool holder 106 contacts this stop. This causes tool holder 106 to move upwardly relative to the projecting ends of the slide and, as a result, any sections of insulation are dislodged by the projecting ends of fingers 340. These sections of insulation fall into the path of the air stream from air hose 328 and nozzles 329 and are carried rearwardly as previously explained.

*Operation*

Assuming that the ram is at its top dead center position, the operation of the device is as follows (see timing diagram FIGURE 19):

During about the first 47° of rotation of shaft 16, wire is fed through the two sets of gripping jaws, across the tops of the lower insulation cutting knives and the lower shearing blade and into ejector tube 318. Shortly after wire feed stops, tool holder 106 bottoms as the upper cutting and severing tools meet their complementary lower tools to sever a lead from the end of the wire and cut the insulation of the trailing end of the lead and the leading end of the wire. At this time spring 238 closes the gripping jaws on the wire and lead as shown in FIGURE 8. Immediately thereafter rack bars 166, 166′ are actuated by cam 142 to rotate cams 202, 202′. These cams cause slides 188, 198, 188′, 198′ to pull the ends of the wire and lead axially away from each other and subsequently to reposition the ends at their respective crimping stations. During this interval feed fingers 250, 250′ are cocked by cams 270, 270′. Upon arrival of the stripped ends of the wire and lead at their respective crimping stations tampers 298, 298' depress jaw carriages 208, 208' thereby to release the jaws from gripping engagement with the wire and lead as shown in FIGURES 9 and 10 while lowering the stripped ends of the wire and lead into the previously positioned terminals. The crimping tools of the ram then bottom as the ram reaches bottom dead center and a terminal is thus affixed to the leading end of the wire and to the trailing end of the lead. At this time detents 120 enter notches 118 so that the ram and tool holder 106 will rise as a unit. For a short interval as the ram begins to rise, plunger 306 is depressed by cam 312 and compressed air flows through air hoses 322, 323, and 314 to eject the finished lead from tube 318 and to remove any adhering sections of insulation from the lower wire severing and insulation cutting blades. During this same interval, slide 330 contacts stop 122 and, as the tool holder moves upwardly relative to the slide, fingers 340 disengage any lodged insulation from the upper shearing blade and cutting knives. Upon farther upward movement of the ram, tool holder 106 contacts stop 122 which causes disengagement of detents 120 from notches 118. Thereafter the ram moves upwardly over the tool holder until the detents enter notches 116.

During the upward movement of the ram, rack bars 166, 166' are again actuated to actuate again slides 188, 198, 188', 198' and return the jaw carriages to their aligned position of FIGURE 4. The sequence of operations during this portion of the cycle is the reverse of that shown in FIGURES 5A to 5D. During about the last 93° of the travel of the ram, wire is fed through the jaws and into the ejector tube. Terminals are fed during this portion of the cycle as cams 270 and 270' are raised and fingers 250, 250' are urged inwardly toward the operating zone under the influence of springs 262, 262'.

It should be noted that the invention is readily adaptable to the production of leads having a closed barrel terminal, of the general type shown in FIGURE 3 of the U.S. Patent to Pierce, No. 2,715,764, on one or both ends thereof. The feasibility of applying these closed barrel terminals by the practice of the present invention stems from the fact that when such a terminal is applied to a lead, it is necessary to insert the bared end of the wire into the terminal by moving the wire substantially axially into the ferrule of the terminal. In the past this has usually been accomplished manually since prior art lead making machines are not capable of moving the bared end of the wire axially toward the terminal. The instant invention, however, does incorporate this type of motion of both the leading end of the wire and the trailing end of the lead as shown in FIGURES 5A to 5D. It will be apparent to those skilled in the art that the movement of the stripped end of the lead as shown in FIGURES 5C and 5D can be utilized to effect insertion of the end of the lead into a closed barrel as well as an open barrel terminal.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

We claim:

1. A lead making machine comprising reciprocable ram means, severing blades on said ram means, insulation cutting knives on said ram means on opposite sides of said wire severing means, said severing blades and said knives being in axial alignment, a pair of releasable wire clamps on opposite sides of said knives, means for intermittently feeding conductor through said wire clamps and past said severing means and said knives, means responsive to said ram means for closing said clamps into gripping engagement with said conductor, a pair of crimping dies carried by said ram means laterally of said aligned knives and severing means in a plane extending normally of the direction of reciprocation of said ram means, and means responsive to said ram means for moving said clamps axially along said feed path in opposite directions and away from said severing means thereby to strip insulation, and then laterally of said path to deliver the severed and stripped ends of said conductor to positions beneath said crimping dies whereby upon bottoming of said crimping dies, connectors are crimped onto said stripped ends.

2. A machine as set forth in claim 1, including a tool holder carried by said ram means and slidable relative thereto in the direction of reciprocation of said ram means between an extended position and a retracted position, means for releasably locking said tool holder in said extended position, said severing means and said knives being carried by said tool holder whereby upon descent of said ram means and with said tool holder in said extended position, a fed conductor is severed and the insulation adjacent the severed ends is circumferentially cut, and during further descent of said ram means, said moving means moves said clamps to position said conductors beneath said crimping dies.

3. A lead making machine comprising a pair of press members reciprocable relatively towards and away from each other, a pair of conductor severing blades on said press members, a pair of insulating cutting knives on said press members adjacent said blades and aligned therewith on a common axis, a releasable wire gripping clamp normally disposed on said common axis and adjacent said blades, means for intermittently feeding insulated electrical conductor along a path coincident with said common axis, means responsive to said press members for actuating said feeding means while said press members are apart, means for engaging said clamp with said conductor after feeding thereof, a pair of crimping dies disposed beside said common axis and in plane extending normally of the direction of reciprocation of said press members, terminal feeding means for feeding a succession of terminals to said crimping dies, means responsive to said press members for moving said gripping means along a path extending along said common axis and away from said knives and laterally towards said crimping dies, means for closing said clamp after cooperative engagement of said blades and knives and before said dies engage each other whereby, a lead is severed from the end of said conductor after feeding thereof and the leading end of said conductor is stripped and transferred to said crimping dies and a terminal is crimped thereon.

4. A lead making machine comprising, a pair of press members movable relatively towards and away from each other along a predetermined path, a tool holder in one of said members and normally projecting towards the other of said members a distance greater than the shut height of said members, said tool holder being slidable from its normal extended position to a retracted position, detent means acting between said tool holder and said one member to retain said tool holder in either its extended or retracted position, a pair of wire severing blades and a pair of insulation cutting knives, said blades and knives being aligned to cooperate on a common axis, one of said blades and one of said knives being secured to said tool holder and the other of said blades and knives being secured to said other member, a pair of cooperable terminal crimping dies, one die of said pair being secured to each of said press members beside said common axis, said dies being closed when said press members are at their shut height, conductor feeding means for feeding an insulated electrical conductor along a predetermined path which coincides with said common axis, means for actuating said conductor feeding means while said press members are away from each other, a conductor clamp normally disposed on said predetermined path and adjacent said pair of knives, clamp transfer means for moving said conductor clamp first along said predetermined path and away from said knives and then laterally to a position adjacent dies, means on said press members for engaging said clamp with said conductor after feeding thereof, and means for actuating said clamp transfer means during the interval between cooperative engagement of said knives and blades and closure of said dies.

5. A lead making machine comprising, a press including a ram movable relatively towards and away from a press platen, a tool holder carried by said ram and movable relative thereto from an extended to a retracted position, a pair of wire severing blades and two pairs of insulating cutting knives, one member of each of said pairs being mounted on said tool holder and the other member of each of said pairs being mounted on said platen, said pairs of knives and blades being axially aligned with said pair of blades being between said pairs of knives, two sets of crimping dies, one die of each set being mounted on said ram and the other die of each set being mounted on said platen, said die sets being disposed on opposite sides of the axis of said knife and blade pairs, said knives and blades being closable into cooperative engagement prior to bottoming of said ram, wire feeding means for feeding wire along a predetermined path coinciding with said axis, a pair of wire clamps on said press platen normally disposed on said predetermined path and on each side of said blade and knife pairs, moving means responsive to said ram means for moving said clamps from their normal positions axially away from each other and then laterally thereof to strip insulation from said wires and position the stripped ends thereof at said dies, and means for actuating said moving means during the interval between closure of said knives and blades and bottoming of said ram whereby, a lead is severed from said wire and insulation adjacent the trailing end of the lead and adjacent the leading end of said conductor is circumferentially cut, and thereafter upon movement of said clamps said cut insulation is stripped from said ends, and said ends are transferred to said dies, and terminals are crimped onto said ends.

6. A lead making machine comprising, a releasable wire clamp and a releasable lead clamp, said clamps being normally aligned axially and normally open, wire feeding means for axially feeding a predetermined length of insulated wire along a wire feed path extending through said wire clamp and said lead clamp, cooperable severing blades disposed on said path between said wire and lead clamps, cooperable insulation cutting knives on said path and on each side of said severing blades, reciprocable cutting and severing ram means for moving said knives and blades into cooperative engagement thereby to sever a lead from the end of a fed wire and to cut insulation adjacent the trailing end of said lead and adjacent the leading end of said wire, means for causing said cutting and severing ram means to dwell after said knives and blades have been moved into cooperative engagement, two crimping die sets each disposed beside said conductor feed path, crimping ram means for closing said die sets during the dwell period of said cutting and severing ram means, terminal feeding means for feeding a succession of terminals to said crimping die sets, said clamps being movable axially along said feed path away from each other and then laterally to positions adjacent said die sets, means responsive to said crimping ram means for closing said clamps at substantially the beginning of said dwell, and clamp moving means responsive to said crimping ram means for moving said clamps during said dwell and prior to closure of said crimping dies whereby said wire and lead are stripped and delivered to crimping positions adjacent said dies and terminals are crimped onto the ends of said wire and lead.

7. A device as set forth in claim 6 wherein said cutting and severing ram means comprises a tool holder slidably mounted in said crimping ram means, said means for causing said cutting and severing ram means to dwell comprising detent means acting between said tool holder and said crimping ram means for retaining said tool holder in an extended position relative to said crimping ram means during movement of said blades and knives towards each other, said detent releasing said tool holder to permit relative sliding motion of said crimping ram means during said dwell period.

References Cited in the file of this patent

UNITED STATES PATENTS

| | | |
|---|---|---|
| 753,771 | Whitmer | Mar. 1, 1904 |
| 948,484 | Snow | Feb. 8, 1910 |
| 2,132,242 | Lundeen | Oct. 4, 1938 |
| 2,225,739 | Elliott | Dec. 24, 1940 |
| 2,245,676 | Johnson | June 17, 1941 |
| 2,340,448 | Andren | Feb. 1, 1944 |
| 2,438,023 | Sirp | Mar. 16, 1948 |
| 2,497,112 | Andren | Feb. 14, 1950 |
| 2,515,105 | Weisberg | July 11, 1950 |
| 2,592,276 | Hackbarths | Apr. 8, 1952 |
| 2,639,487 | Kelley | May 26, 1953 |
| 2,645,959 | Fuchs | July 21, 1953 |
| 2,688,133 | Berg | Sept. 7, 1954 |
| 2,715,764 | Pierce | Aug. 23, 1955 |
| 2,774,130 | Folkenroth | Dec. 18, 1956 |

FOREIGN PATENTS

| | | |
|---|---|---|
| 715,091 | Great Britain | Sept. 8, 1954 |